May 31, 1938.  S. ARNOLD, 3D  2,119,262
REMELTING SCRAP METAL
Filed March 20, 1934
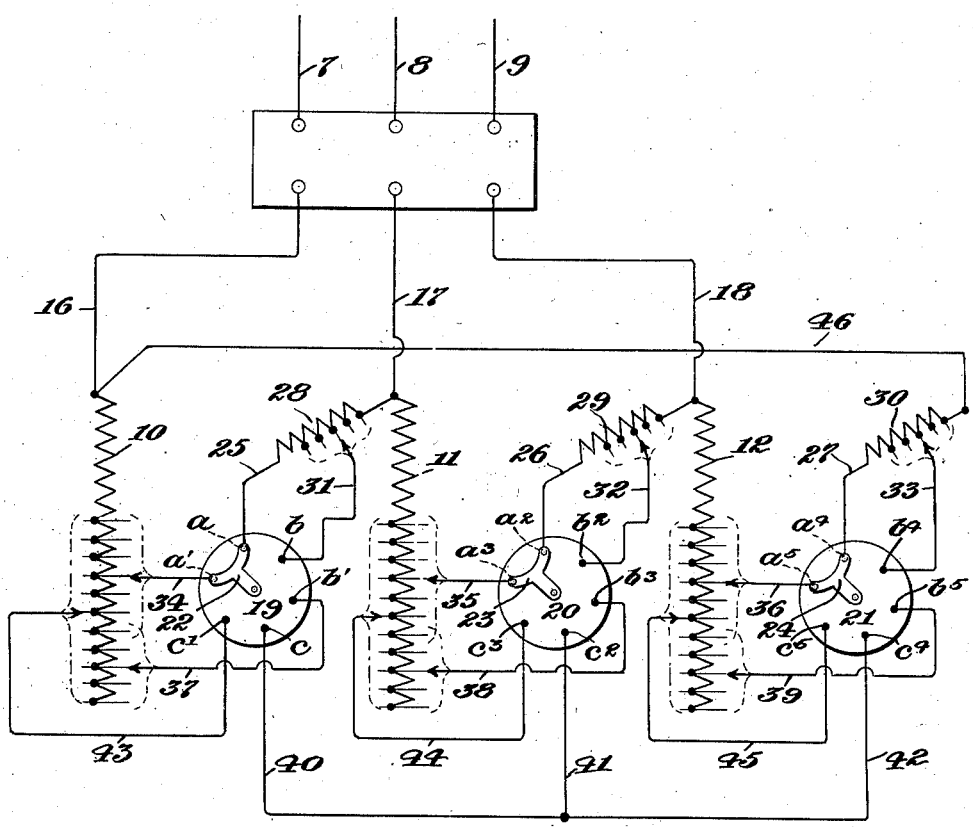
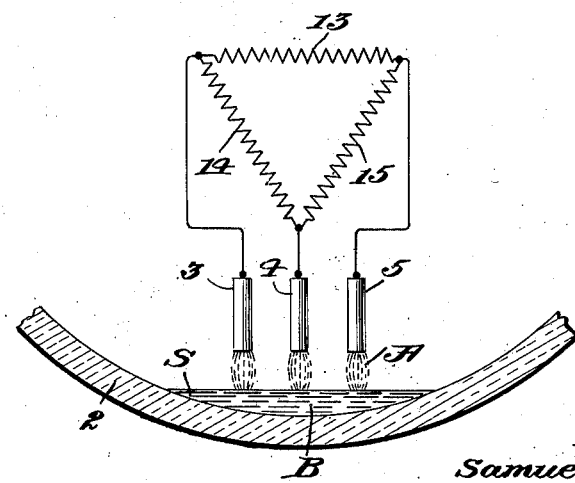
Inventor:
Samuel Arnold, 3rd,
By: John Howard Joynt
His Att'y.

Patented May 31, 1938

2,119,262

UNITED STATES PATENT OFFICE 2,119,262

REMELTING SCRAP METAL

Samuel Arnold, 3rd, Pittsburgh, Pa., assignor, by mesne assignments, to Rustless Iron and Steel Corporation, Baltimore, Md., a corporation of Delaware Application March 20, 1934, Serial No. 716,537

5 Claims. (Cl. 75—12)

The present application is a continuation in part of my copending application 459,877, filed June 9, 1930 and entitled Method of producing molten metals, and the invention relates broadly to the art of melting metal, and more particularly to the melting of ferrous alloy metals, especially to the remelting of rustless iron and steel, in electric arc furnaces.

Among the objects of my invention is the simple, practical and direct remelting of readily available and inexpensive alloy iron and steel scrap, containing considerable amounts of readily carburizable alloying ingredients, with a minimum loss of the alloying ingredients through oxidation and minimum contamination of the metal with undesirable materials encountered in the melting operation, all with maximum economy, efficiency and reliability, thereby achieving clean, sound alloy iron or steel at low cost.

The invention accordingly consists in the several steps and the relation of each of the same to one or more of the others as described herein, the scope of the application of which is indicated in the following claims.

In the accompanying drawing the single figure is a diagrammatic representation of an electric arc furnace and the associated system supplying electrical energy thereto, for conducting the remelting of alloy iron and steel scrap in accordance with the practice of my invention.

As conducive to a clearer understanding of certain features of my invention it may be noted at this point that the increasing use of special alloy steels, and more particularly steels containing alloy ingredients such as chromium, which are easily oxidized and readily carburized, has made the problem of electric furnace operation an exceedingly difficult one. Where the accepted type of electric arc furnace (the furnace arcs acting directly upon the furnace charge as in the Heroult furnace) is utilized for the remelting of, for example, low carbon alloy steel scrap containing chromium, such as rustless iron or steel (including a carbon content of about .05% to .12% and a chromium content of about 12% to 27%), there is a tendency for the metal to pick up carbon not only during the melting down period, but also during the refining period, because of the great avidity of chromium-containing metal for carbon. This tendency becomes greater with the increased percentage of chromium and is considerably augmented by the initially low carbon content of the metal since the thirst for carbon becomes increasingly great with a decreased percentage of carbon. The opportunity for the metal to pick up large quantities of carbon is largely due to the contact of the electrodes with the scrap during the melting down period and to the excessive pick-up of carbon during the refining period from the very short electric arcs containing carbon in a very active state as well as to the occasional dipping of the electrodes in the bath during this period.

Where the carbon content of the alloy is increased and the bath then oxidized in the usual manner to eliminate carbon, it necessarily follows that the chromium is oxidized before the carbon, with the resultant loss of such alloy in the slag. To again reduce the alloy from the slag to the bath not only represents an increase in production costs, because of the cost of the necessary reducing agent, and a considerable loss of time incident to this reduction operation, but also a loss in the alloy itself.

In order to obviate such an increase in the carbon content of the alloy and thereby effect the saving of alloys such as chromium, which are necessarily expensive, recourse has been had to the use of induction furnaces. More particularly have efforts been made to use induction furnaces of the low frequency core type, but on account of the initial expense of installations suitable for this purpose, the high cost of operation and the many inconveniences encountered therein, the process of remelting alloy scrap in this manner has been exceedingly expensive and tedious.

In accordance with the present invention, I provide an improved process which, while adaptable to the melting of scrap metal of different types and compositions, is particularly suitable for the remelting of low carbon alloy steel scrap containing readily carburizable alloy metals such as chromium, and is especially adapted to the remelting of rustless iron and steel scrap where ferrous metal of high chromium content and low carbon content is dealt with. I preferably carry out the process by maintaining a molten bath within an electric furnace, charging into this bath the scrap metal to be melted, removing portions only of the molten bath, and successively charging the bath with new scrap and removing portions of the molten bath therefrom.

In the practice of my invention, I preferably utilize a furnace the diameter of which is large in proportion to the volume of metal contained, and apply such a voltage to the electrodes that a long standing arc is maintained from electrode to metal charge, thus making it possible to keep the electrodes well above the bath and thereby prevent carbon contamination of the character referred to.

My process is further unique in that I utilize comparatively high voltage arcs, the voltage being of sufficient value to maintain long arcs and thus prevent contact between electrodes and metal and so preclude contamination of the metal by the carbon in the furnace electrodes. In accordance with accepted practice at the present time, the melt-down voltage covers a range of from 75 to 145 volts across the arcs, while, after a molten bath is formed a voltage of from 40 to 75 volts across the arcs is used, the particular voltage employed depending upon the power input of the furnace, the size of the furnace, and other variable conditions.

In accordance with the present invention, the voltage used after a molten bath is formed varies from 75 to 450 volts across the arcs depending upon the furnacing conditions of slag and metal, this being considerably higher than that recognized as accepted present day practice, and ordinarily sufficient to maintain the conditions desired. While the range given does not constitute a limitation in the voltages which may be utilized in practicing my invention, it is the range in which I have found that the best results are obtained. To produce standing arcs of sufficient length, I utilize comparatively high values of reactance in the circuit which is hereinafter described in greater detail, the value of the reactance being determined by the power factor desired.

Were long naked arcs of the character referred to utilized in a furnace of the usual construction and dimensions, the refractory loss would be extremely high due to the intensity of the radiant energy incident on a unit area of the furnace walls and roof. By utilizing a furnace, however, the diameter of which is considerably greater in proportion to the volume of metal than is the case with standard furnace, thus increasing the distances between the arcs formed on the furnace side walls and roof, and placing the electrodes as close together as possible, in order to further increase these distances, the radiation to the side wall is reduced to a minimum, and the entire process is thus made feasible.

As indicated in the drawing, the furnace 2 is of relatively large diameter, in order to increase the distance between the furnace electrodes and the furnace walls and thus decrease the amount of heat energy incident on a unit area of the furnace side walls and roof so as to prevent excessive fluxing and spalling of roof and walls where the more exposed and/or hotter arcs are employed. (The diameter is much larger with respect to the volume of molten metal contained in the furnace than has heretofore been customary.)

The furnace electrodes 3, 4 and 5 are conveniently arranged closely together adjacent the center of the furnace 2 whereby they are maintained at a maximum distance from the refractory walls of the furnace in order to further decrease the amount of heat falling upon the wall surface, and so prevent fluxing of the refractories, and contamination of the metal, and directly prolonging the life of the furnace walls.

It is to be noted at this point that the side walls or banks of the furnace preferably slope inwardly from top to bottom, as generally indicated in the drawing. The material charged into the furnace bath lies against the walls of the furnace in a position out of contact with the furnace electrodes. It will be appreciated that while the material is in this position it directly aids in protecting the walls from reaching excessive temperatures under the action of the intense heat radiated from the furnace arcs. In addition, the material to be melted is placed in a position to be rapidly and efficiently melted.

In my Letters Patent No. 1,629,196 of May 17, 1927, there is disclosed a method of operating electric arc furnaces by means of which there is employed an intermediate voltage for initiating a melt, a relatively higher voltage for the main melting period, and a relatively lower voltage for the refining operation. Such a control is generally applicable in accordance with the present invention. In the accompanying drawing, however, there is illustrated diagrammatically another form of circuit by means of which the remelting of scrap in accordance with the present invention is carried out, the drawing showing the general physical relationship between the electrodes and the furnace.

Referring more particularly to the drawing, illustratively three-phase alternating current electrical energy is supplied furnace 2 from any convenient source (not shown). Interposed between the furnace and the source of energy there is provided a main-line automatic overload-protected oil circuit-breaker 6, of any usual construction connected to the source by way of power lines 7, 8 and 9. In accordance with the illustrated embodiment of my invention, there are provided three high-voltage primary windings, 10, 11 and 12 of a three-phase transformer, or a bank of three single-phase transformers, respectively connected by way of conductors 16, 17 and 18 to circuit-breaker 6. The low tension transformer secondary coils 13, 14 and 15 cooperating with high voltage primary windings 10, 11 and 12 are preferably connected in three phase delta, as indicated in the drawing. Transformer output circuit is supplied furnace 2 by way of high current carrying capacity leads which are permanently or otherwise suitably connected to the electrodes 3, 4 and 5.

The furnace electrodes are of carbon or graphite and are of any desired standard construction for operation in connection with the electric furnace 2, it being remembered, however, that the electrodes are preferably placed as close together as possible, (without, however, permitting direct arcing between electrodes) and also adjacent the center of a furnace which is of materially greater diameter relative to its contained charge than that representing accepted known practice as indicated above.

In order to achieve a desired control of the electric furnace arcs during the melting down and refining of the metal, the present invention further contemplates the utilization, with each of the transformers, of tap-changers which are conveniently built into the transformer but are operated externally of the same by means of a suitable shaft or shafts, rotated by hand or by suitable motive means in the usual manner. By means of the tap-changers the transformers are connected in a variety of three phase delta and Y connections to achieve a wide variety of secondary potentials applied across the furnace electrodes as appears more fully hereinafter.

In the drawing there are illustrated three tap-changers 19, 20 and 21, respectively cooperating with the high voltage transformer primary windings 10, 11 and 12. The tap-changers, which have two or more sets of contacts, and which are preferably so interlocked as to be simultaneously operated, are in effect rotary switches having respectively rotating contact elements 22, 23 and 24. In tap-changer 19, for example, the contact element 22 is adapted, in accordance with the position to which it is adjusted, to cooperate with and join the contacts $a$, $a'$, $b$, $b'$ or $c$, $c'$. In like manner, in tap-changer 20, the element 23 is adapted to cooperate with and join the contacts $a^2$ and $a^3$, the contacts $b^2$ and $b^3$, and the contacts $c^2$ and $c^3$; while in tap-changer 21 the contact element 24 cooperates with and joins the contacts $a^4$ and $a^5$, the contacts $b^4$ and $b^5$, and the contacts $c^4$ and $c^5$, as will be understood by those skilled in the art.

To permit the introduction of a large amount of reactance into the transformer circuit, the contacts $a$, $a^2$ and $a^4$ of the respective tap-changers 19, 20 and 21 are conveniently connected by leads 25, 26 and 27 respectively to one end of each of the reactor coils 28, 29 and 30. (To permit the introduction of a smaller amount of reactance into the transformer circuit the contacts $b$, $b^2$ and $b^4$ are connected by leads 31, 32 and 33 respectively to any desired intermediate tap of the respective reactor coils as indicated.) The other ends of the respective reactor coils are connected by suitable conductor means to the transformer primary windings of the next successive phase as indicated in the drawing.

To complete the connections between reactors and the several transformer primary windings of like phase, connections are taken from the several tap-changer switches to the respective transformer primary windings. Thus, the contacts $a'$, $b'$; $a^3$, $b^3$; and $a^5$, $b^5$ of the respective tap-changer switches 19, 20 and 21 are connected to any one of a number of taps on the lower ends of the respective high potential transformer windings 10, 11 and 12. For example, as indicated in the drawing, the contacts $a'$, $a^3$ and $a^5$ are respectively connected by way of leads 34, 35 and 36 to any one of a number of transformer taps of the respective windings 10, 11 and 12, while the contacts $b'$, $b^3$ and $b^5$ are also adapted to be connected by way of leads 37, 38 and 39 to any one of a series of transformer taps of the respective windings 10, 11 and 12.

The high potential transformer secondary windings are connected in a three phase delta connection when, as indicated in the drawing, the contact elements 22, 23 and 24 of the respective tap-changers 19, 20 and 21 cooperatively engage contacts $a$, $a'$; $a^2$, $a^3$; and $a^4$, $a^5$. With this setting of the tap-changers the transformer winding 10 is connected by way of lead 34, contact $a'$, tap-changer element 22, contact $a$, conductor 25 and reactor 28 to one end of the next adjacent transformer winding 11 to form one leg of the three-phase delta connection. Similarly, the winding 11 is connected by way of lead 35, contact $a^3$, tap-changer element 23, contact $a^2$, conductor 26, and reactor 29 to one end of the third transformer winding 12 thus forming the second leg of the delta connection. Likewise, by way of lead 36, contact $a^5$, element 24, contact $a^4$, conductor 27, reactor 30 and conductor 46 transformer winding 12 is connected to one end of winding 10 to complete the last leg of the three-phase delta connection of the high potential primary windings of the transformer.

A three-phase delta connection of the transformer primary winding is also achieved, including a greater proportion of the respective transformer windings 10, 11 and 12 and a lesser proportion of the respective reactances 28, 29 and 30, by adjusting tap-changers 19, 20 and 21 so that the respective tap-changer elements 22, 23 and 24 interconnect the respective contacts $b$, $b'$; $b^2$, $b^3$; and $b^4$, $b^5$. With this adjustment transformer winding 10 is connected by way of lead 37, contact $b'$, element 22, contact $b$, conductor 31 and a portion of reactor 28 to one end of transformer winding 11 to form one leg of the delta connection. In a similar manner the winding 11 is connected by way of lead 38, contact $b^3$, element 23, contact $b^2$, conductor 32 and a portion of reactor 29 to one end of the transformer winding 12, thus forming the second leg of the delta connection. The third leg of this connection is formed by the transformer winding 12 and a part of reactor 30 (interconnected by way of lead 39, contact $b^5$, element 24, contact $b^4$ and conductor 33), connected to transformer winding 10 by conductor 46.

Where desired, the transformer primary windings 10, 11 and 12 may be connected in three-phase Y by a proper adjustment of the respective tap-changers 19, 20 and 21. By setting tap-changers 19, 20 and 21 so that the respective elements 22, 23 and 24 interconnect contacts $c$, $c'$; $c^2$, $c^3$; and $c^4$, $c^5$ respectively, the transformer primary windings 10, 11 and 12 are respectively connected by way of leads 43, 44 and 45; contacts $c'$, $c^3$ and $c^5$; elements 22, 23 and 24; contacts $c$, $c^2$, $c^4$; and conductors 40, 41 and 42 to form a three-phase Y connection. A variation in the portions of the transformer primary windings connected in Y is achieved by means of leads 43, 44 and 45 respectively adapted to be connected to any one of a number of taps at the lower ends of the transformer primary windings 10, 11 and 12, as shown diagrammatically in the drawing.

In the practice of my invention, I first proceed in accordance with either of two different methods to form an initial melt in the furnace; I either charge the furnace with molten metal of the desired composition, the amount of the charge in such case being preferably from 25% to 50% of the holding capacity of the furnace; or, instead of charging with molten metal, I make a standard heat of the analysis to be remelted by, for example, charging the furnace with scrap metal of the desired analysis, and then melting the same in the furnace in accordance with ordinary practice. With the first method, the carbon contamination of the metal by the furnace electrodes incident to the melting down of cold scrap metal to form the initial bath of molten metal is obviated, and this procedure is therefore to be preferred in most cases.

In initially melting down a charge of ingredients to form a bath of steel of the analysis of the scrap metal which is to be melted, the tap-changer switches 19, 20 and 21 are adjusted to connect the transformer primary windings in a three-phase Y connection, all as more particularly described above. Such a connection gives a reduced voltage and increased current ratio between the primary and secondary transformer windings which is especially favorable to the melting down of a charge of cold ingredients. The particular secondary output voltages depend upon the positions of the primary winding taps.

After the desired bath, which for purposes of convenience I have herein designated the initial bath, has been first obtained, the potential on the electrodes is preferably increased much above the normal refining voltage usually utilized, thereby giving long standing arcs playing upon the bath of metal. The long arcs are stabilized by means of additional reactance in the electrical energy supply circuit which enables me to maintain the furnace electrodes at such a distance from the bath that there is comparatively little danger of a direct contamination of the bath from the carbon of the electrodes.

Thus, referring to the drawing, after the initial bath of metal is formed, and the semi-continuous melting process is started, the oil circuit-breaker 6 is opened and the tap-changer switches 19, 20 and 21 adjusted so that the tap-changer elements 22, 23 and 24 cooperate either with the series of "a" contacts or the series of "b" contacts to connect the transformer primary windings in a three-phase delta with a desired proportion of the windings and reactors serially connected therewith, all as more particularly described above. The oil circuit-breaker is then closed whereby the potential applied to the primary windings of the transformer produces a much higher secondary voltage in the windings 13, 14 and 15. The actual secondary voltage in this case of course depends upon the positions of the taps of the primary windings and the particular tap leads to which the contacts of the "a" and "b" series of the respective tap changer switches are connected, as described above, but in general the phase potential applied to the elements amounts to from 75 to 450 volts, the potential being maintained sufficiently high under the varying conditions of metal and slag to assure long standing furnace arcs and a minimum of dipping of the tips of the electrodes into the slag and metal to preclude carbon contamination of the metal, all as more fully indicated above.

Where the delta connection of the transformer primary winding is used, as for continuous operation after an initial bath of metal is formed, all or any portion of the reactances may be inserted in the delta circuit as desired so as to stabilize the operation of the arcs A and maintain the furnace electrodes 3, 4 and 5 well above the slag S on the bath B as generally indicated in the drawing. The added impedance of the transformer primary winding circuits because of the reactors included therein, prevents excessive current and potential fluctuation in the operation of the furnace and thus tends to maintain the arcs uniform throughout the many varying conditions of metal and slag encountered in actual practical operation.

Next, I charge comparatively clean scrap of the analysis to be melted into the molten bath, preferably around the banks of the furnace to preclude any possible direct contact between the furnace electrodes and the pieces of scrap metal. After the scrap is melted I tap a portion only of the molten metal, leaving a bath of metal in the furnace of about 25% to 50% of the furnace holding capacity. More scrap is then added to the remaining metal, the scrap melted, and the furnace tapped as before. It will thus be seen that the process is a semi-continuous one in which a molten bath of 25% to 50% of the furnace holding capacity is maintained within the furnace at all times, the operation being one of successively charging scrap into this bath and successively tapping portions only from the bath at desired intervals.

The melting of scrap metal, especially alloy irons and steels such as rustless irons and steels, in accordance with the teachings of my invention is carried out either with an acid or a basic furnace, employing the usual calcium oxide or silica slags to blanket the molten metal as is customary in the operation of electric furnaces.

By maintaining a bath into which the scrap is charged, the irregularity of furnace operation incident to melting down cold scrap, where the furnace electrodes are continually brought into direct contact with the scrap metal and the forming bath of molten metal, is largely avoided and it is possible to continuously effect melting under such conditions that the electrodes do not contaminate the bath and substantially no carbon pick-up is encountered in melting down a material, such as rustless iron or steel scrap, where the tendency toward carbon contamination is exceedingly great as more particularly referred to above.

In addition to this, the maintained bath results in the production of successive portions of molten metal which are more nearly uniform in their characteristics inasmuch as each portion tapped from a furnace will possess some of the characteristics of a number of different charges, the retained bath serving to render these portions more and more uniform because of the blending of successive charges. My method of remelting scrap metal is thus desirable not only from the standpoint of ability to conserve alloy metals and prevent the oxidation thereof, and so prevent the loss and/or expense incident to a recovery of the oxidized alloy metal, but from the ability to produce successive heats having more nearly uniform analyses.

As it is frequently necessary to patch the furnace or to remake the bottom, the furnace may from time to time be completely drained, the desired repairs effected and the process started as before, either by making a new heat of the analysis to be melted or by recharging the hot furnace by a portion of the heat which temporarily has been held in a ladle or other receptacle.

As illustrative of the practice of my invention in the remelting of rustless iron scrap, for example, a six-ton three-phase Heroult electric arc furnace rated 25 cycles, 3,000 kva. 75–450 volts and having a magnesite bottom is charged with approximately 4,500 pounds of molten hot metal analyzing about 17.3% chromium, .10% carbon, .45% silicon, .40% manganese, usual sulphur and phosphorus, and the balance substantially iron to form an initial or reception bath. A protecting slag is formed on the bath of metal by adding thereto about 300 to 750 pounds of burnt lime. The metal is preferably continuously heated by means of long standing electric arcs playing upon the slag; the long arcs being maintained and stabilized, as more particularly described above.

About 13,500 pounds of rustless iron scrap having an average analysis of approximately, 17.2% chromium, .10% carbon, .50% silicon, .50% manganese, .025% sulphur, .025% phosphorus and the balance substantially iron, are charged into the furnace in three or four successive batches, each batch of scrap being preferably charged around the banks of the furnace and away from the furnace electrodes to preclude contact therewith. The rustless iron scrap rapidly melts under the action of the heat radiated from the furnace arcs, and reflected from furnace side walls and roof, and the heat directly contributed by the bath itself. Batches of scrap are added as permitted by the condition of the molten metal; in general the major portion of the scrap added should be assimilated by the bath before the addition of further quantities of scrap in order to minimize the amount of scrap metal floating in the bath and under the furnace electrodes.

Additional quantities of burnt lime may be added from time to time during the remelting of the scrap metal to assure the maintenance of a slag of a desired character. In order to assure a neutral condition of the slag, or perhaps a condition of slight reducing characteristics, fine ferrosilicon is added in small quantities during the remelting period.

When the charge of rustless iron scrap is completely melted and the melted metal is brought up to a desired temperature about 200 pounds of 50% ferrosilicon and 75 pounds of low carbon ferromanganese are then added in accordance with standard practice to compensate for silicon and manganese lost through oxidation. The heat of metal is then tapped, leaving, however, about 4,000 pounds of hot metal in the furnace as an initial or reception bath for the next charge of rustless iron scrap; the reception bath for the next charge thus amounting to about 25% of the total heat present in the furnace immediately prior to tapping.

Another charge of rustless iron scrap of about 12,000 to 14,000 pounds is then added as above, and the process repeated.

The tapped metal weighs about 13,500 pounds and analyzes about 17.2% chromium, .10% carbon, .45% silicon, .35% manganese, usual sulphur and phosphorus, and the balance substantially iron.

While, as illustrative of my invention, the remelting of high chromium low-carbon iron or steel scrap metal, commonly known as rustless iron or steel, is specifically described, it will be understood that the remelting of high manganese steel, high silicon iron, high speed steel and like irons and steels requiring close carbon control may be reliably, efficiently and economically remelted in accordance with the provisions of my invention.

Likewise, while, for purposes of illustration, the production of a heat of rustless iron by remelting rustless iron scrap having an average approximate analysis of that desired is described above, it will be understood that the reception bath and the rustless iron scrap charged may have analyses of chromium somewhat above or below the values desired in the tapped metal, a reception bath of high chromium content being used where the rustless iron scrap is lower in chromium than is desired. Similarly, where the chromium content of the available rustless iron scrap is higher than that required in the finished metal, an initial bath of lower chromium content is conveniently employed.

Substantially no carbon loss or pick-up is experienced in remelting scrap rustless iron and steel in accordance with the provisions of my invention so that the percentage of this ingredient is generally fixed. Any chromium lost through oxidation, however, may be compensated for by adding to the bath of metal, for example, after the melting of scrap metal is substantially complete a desired quantity of low-carbon ferrochrome; where an increase in carbon content in the tapped metal is permissible the less expensive high-carbon ferrochrome is employed. Or, in like manner, any chromium deficiency in the bath resulting from the remelting of scrap of a lower chromium analysis than desired in the tapped metal, may be made up by ferrochrome additions. Similarly, a bath of excess chromium content may be diluted by the addition of chromium free scrap in a desired amount.

As many possible embodiments may be made of my invention and as many changes may be made in the embodiment hereinbefore set forth it is to be understood that all matter described herein, or shown in the accompanying drawing, is to be interpreted as illustrative, and not in a limiting sense.

I claim:

1. In the remelting of low-carbon alloy iron scrap in an electric furnace of the direct arc type, the art which includes, preparing a bath of molten metal within said furnace, maintaining the bath in molten condition by means of a standing arc to the surface of said bath, successively charging alloy iron or steel scrap into said furnace adjacent the banks thereof, and tapping portions of the bath contained therein to maintain within said furnace a residual bath of not less than about 25% to 50% of the furnace holding capacity.

2. In the remelting of rustless iron scrap in an electric furnace of the direct arc type, the art which includes, providing a bath of rustless iron within said furnace amounting to about 25% of the furnace holding capacity, maintaining said bath in molten condition by means of a standing arc to the surface of said bath, charging successive batches of scrap into the furnace around the banks thereof as previous batches become assimilated by the bath, and tapping the furnace when the bath metal reaches a desired condition leaving metal in the furnace amounting to about 25% of the furnace holding capacity to aid in the melting of additional quantities of scrap.

3. In the remelting of low-carbon alloy iron and steel scrap in an electric arc furnace of the arc on charge type having carbon electrodes, the art which includes, maintaining a bath of metal in said furnace in molten condition by means of 75 to 450 volt standing arcs playing on the surface of said bath, successively charging into said bath remote from the electrodes and around the banks of the furnace alloy iron and steel scrap, and successively tapping portions of said bath of molten metal, whereby the semicontinuous remelting of scrap metal is achieved with a minimum fluxing of the furnace lining and a minimum of contact of furnace electrodes and metal and a consequent maximum freedom from carbon contamination.

4. In the remelting of rustless iron and steel scrap in an electric arc furnace of the Heroult type having carbon electrodes to achieve low-carbon rustless iron or steel, the art which includes, maintaining within said furnace a bath of molten metal heated by means of 75 to 450 volt arcs to the surface of the bath, and intermittently charging into said metal and around the furnace banks batches of rustless iron or steel scrap, the batches of scrap metal protecting the banks of said furnace from the excessive heat of the high voltage arcs and being melted and assimilated by said bath, the maintenance of the high voltage arcs assuring the metal a freedom from contact by the furnace electrodes whereby carbon contamination of the metal is precluded.

5. In the semicontinuous remelting of rustless iron or steel scrap in an electric furnace of the arc on charge type, the art which includes, maintaining a bath of metal within said furnace in molten condition by means of a standing arc to the surface of said bath employing an operating potential up to about 450 volts, charging successive batches of rustless iron or steel scrap around the banks of the furnace, the scrap metal melting under the action of the hot bath and the heat of the furnace chamber, and withdrawing from time to time portions of the molten metal retaining however a residual bath amounting to about 25% of the holding capacity of the furnace.

SAMUEL ARNOLD 3RD.